May 19, 1925. 1,538,117

J. R. JOHNSON

DRUM TYPE MILLING MACHINE

Filed March 10, 1924 8 Sheets-Sheet 3

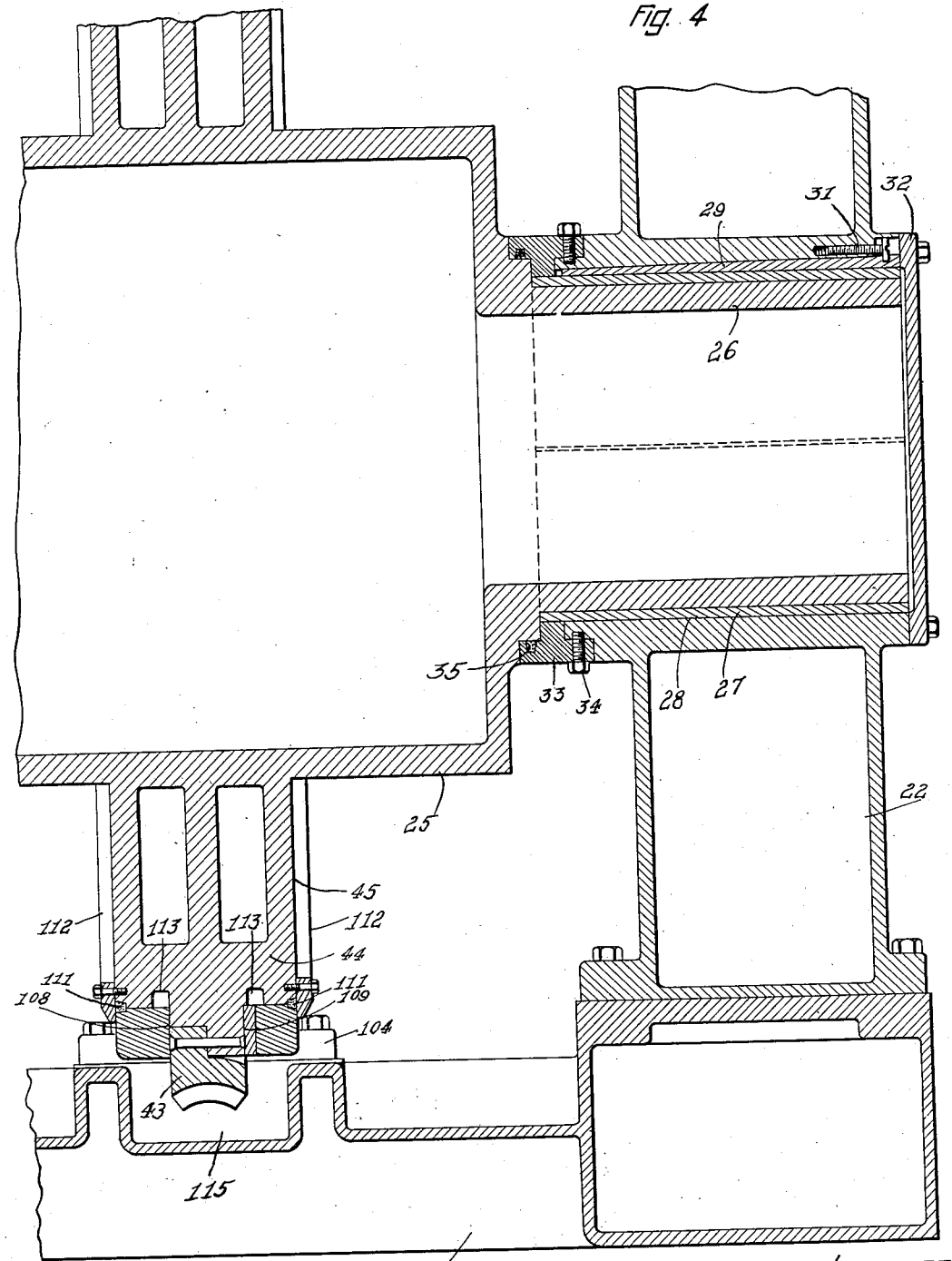

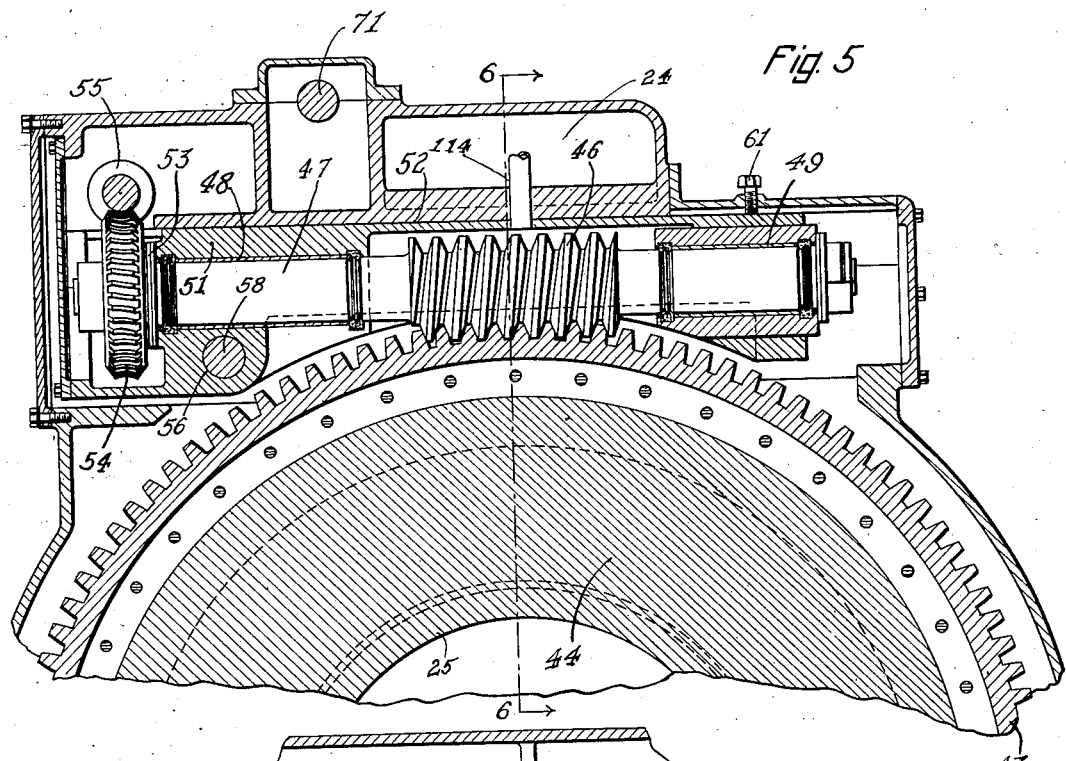
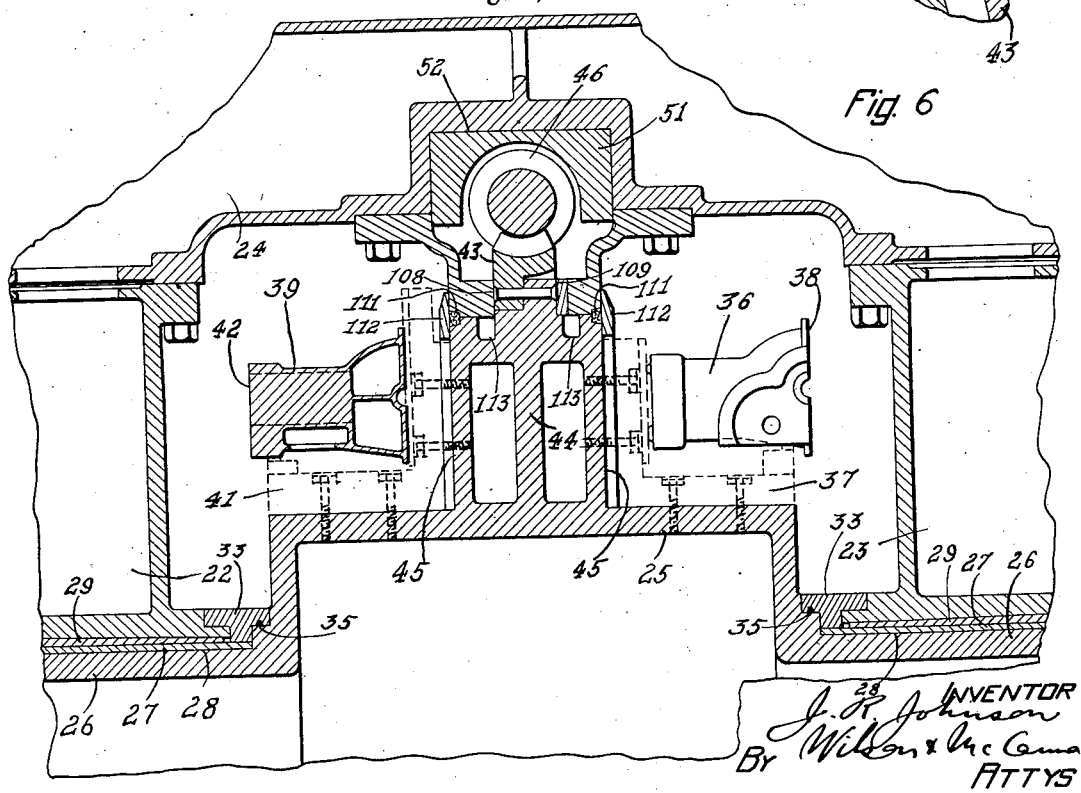

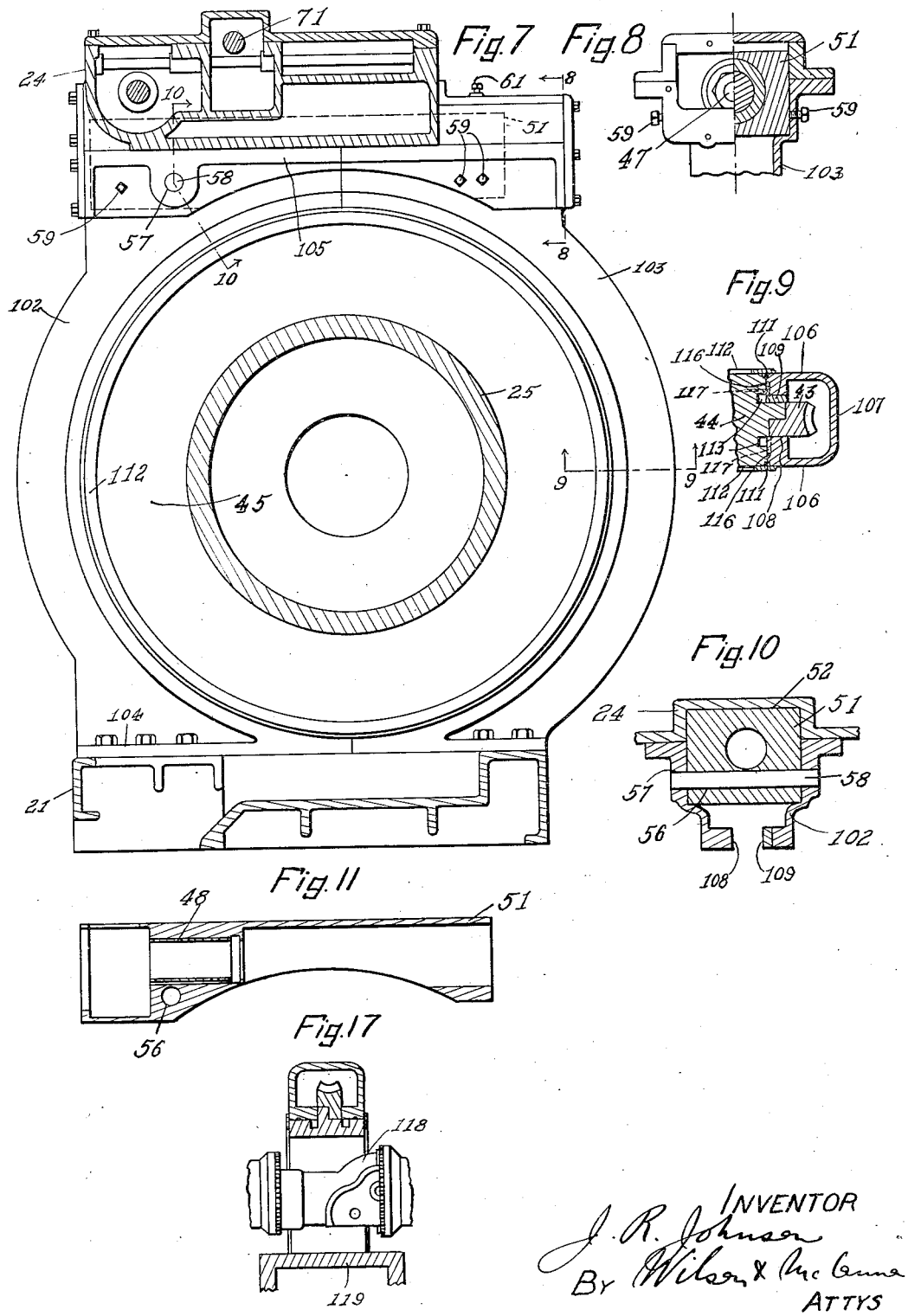

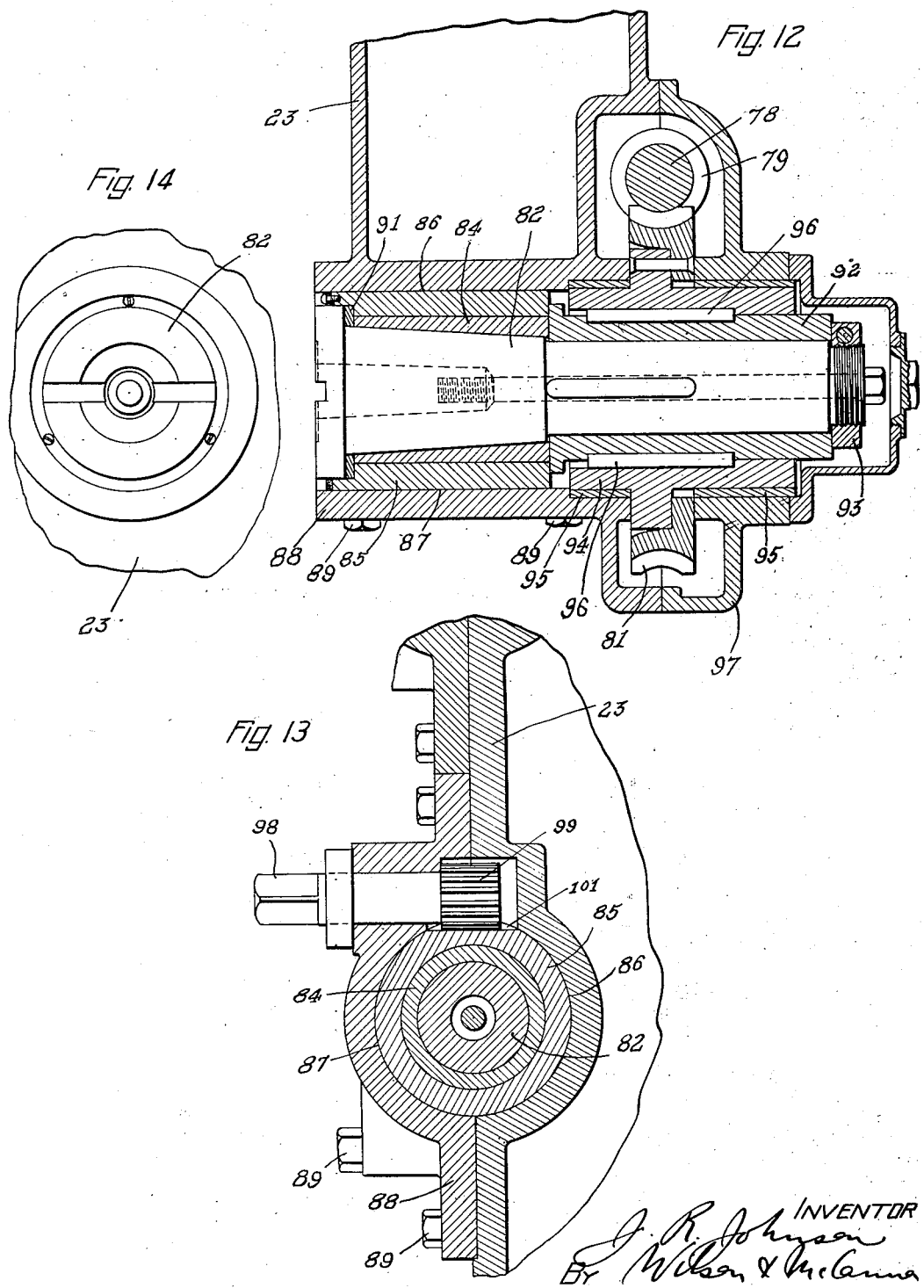

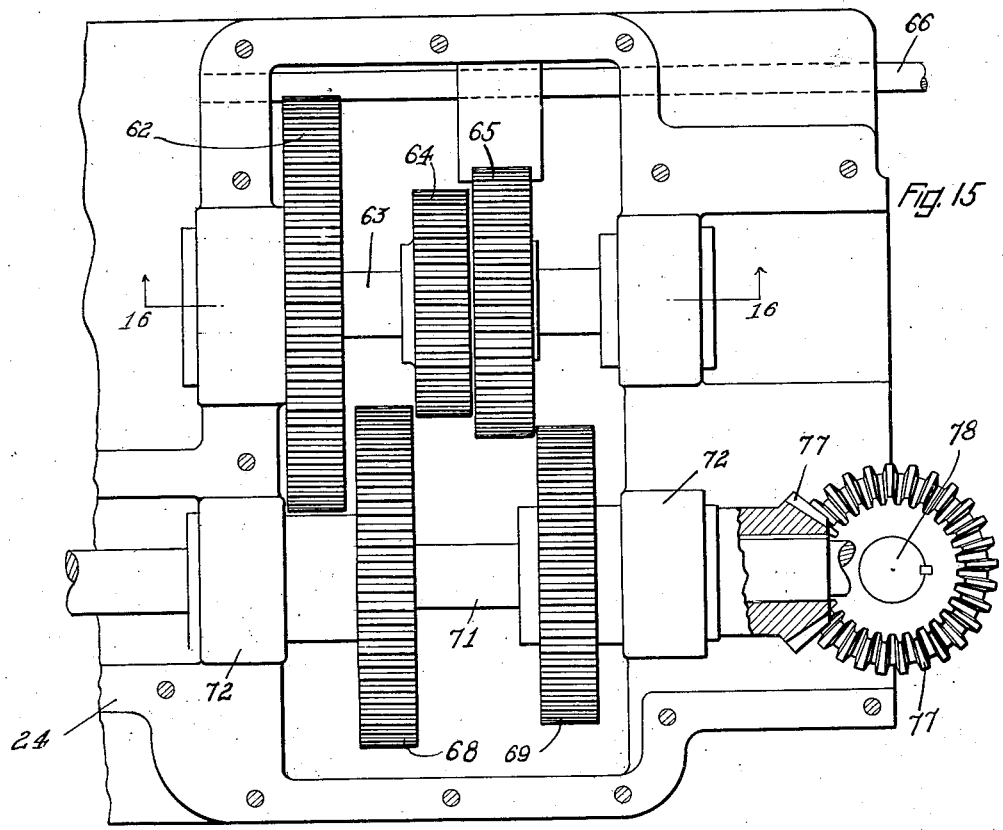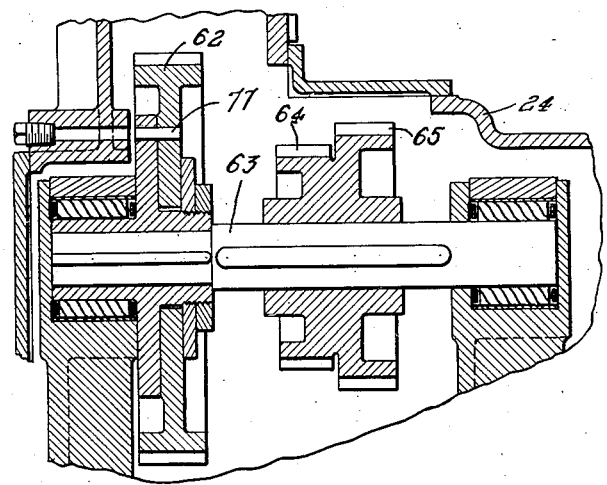

Patented May 19, 1925.

1,538,117

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

DRUM TYPE MILLING MACHINE.

Application filed March 10, 1924. Serial No. 698,053.

*To all whom it may concern:*

Be it known that I, JOHN R. JOHNSON, a citizen of the United States, residing at Rockford, in the county of Winnebago and State of Illinois, have invented certain new and useful Improvements in Drum Type Milling Machines, of which the following is a specification.

This invention relates to drum type milling machines, so called because the work-pieces are mounted on a rotary carrier resembling a drum and may be unloaded and reloaded as the drum revolves. In this type of machine the drum is revolved continuously, but not necessarily so, for feeding the work-pieces in succession past or between the cutters for the machining operation. And, while the present invention in its broader aspect applies to machines of this type regardless of their frame structure and arrangement and location of cutter spindles, it has more particular reference to machines in which the drum is mounted between and upon upright side housings joined by a base and a top plate, thus establishing a rigid and sturdy frame structure, and in which the cutter spindles are mounted in any suitable location on this frame structure for milling the work-pieces in succession. This type of machine is therefore, especially desirable for high production operation because it saves labor, time and floor space.

The primary purpose of the present invention is to provide a machine of the character described, improved especially in regard to the means and method of driving the work-carrying drum.

Another purpose is to improve the driving mechanism in general, the frame structure, the construction and mounting of the cutter spindles, and the mounting of the work-pieces with relation to the cutter spindles and drum-driving means.

Still another purpose is to secure a more direct, powerful and smooth feed of the drum, with the view to further eliminating chatter and obtaining better finish and accuracy in the machining operation, and to obtaining this result, especially in a heavy duty machine at a comparatively low cost.

Other objects and attendant advantages will be appreciated by those skilled in this art as the invention becomes better understood by reference to the following description when considered in connection with the accompanying drawings, in which—

Fig. 4 is a section taken on the line 4—4 of Fig. 2;

Fig. 5 is a section taken on the line 5—5 of Fig. 1;

Fig. 6 is a section taken on the line 6—6 of Fig. 5;

Fig. 7 is a section taken on the line 7—7 of Fig. 1;

Figure 1:
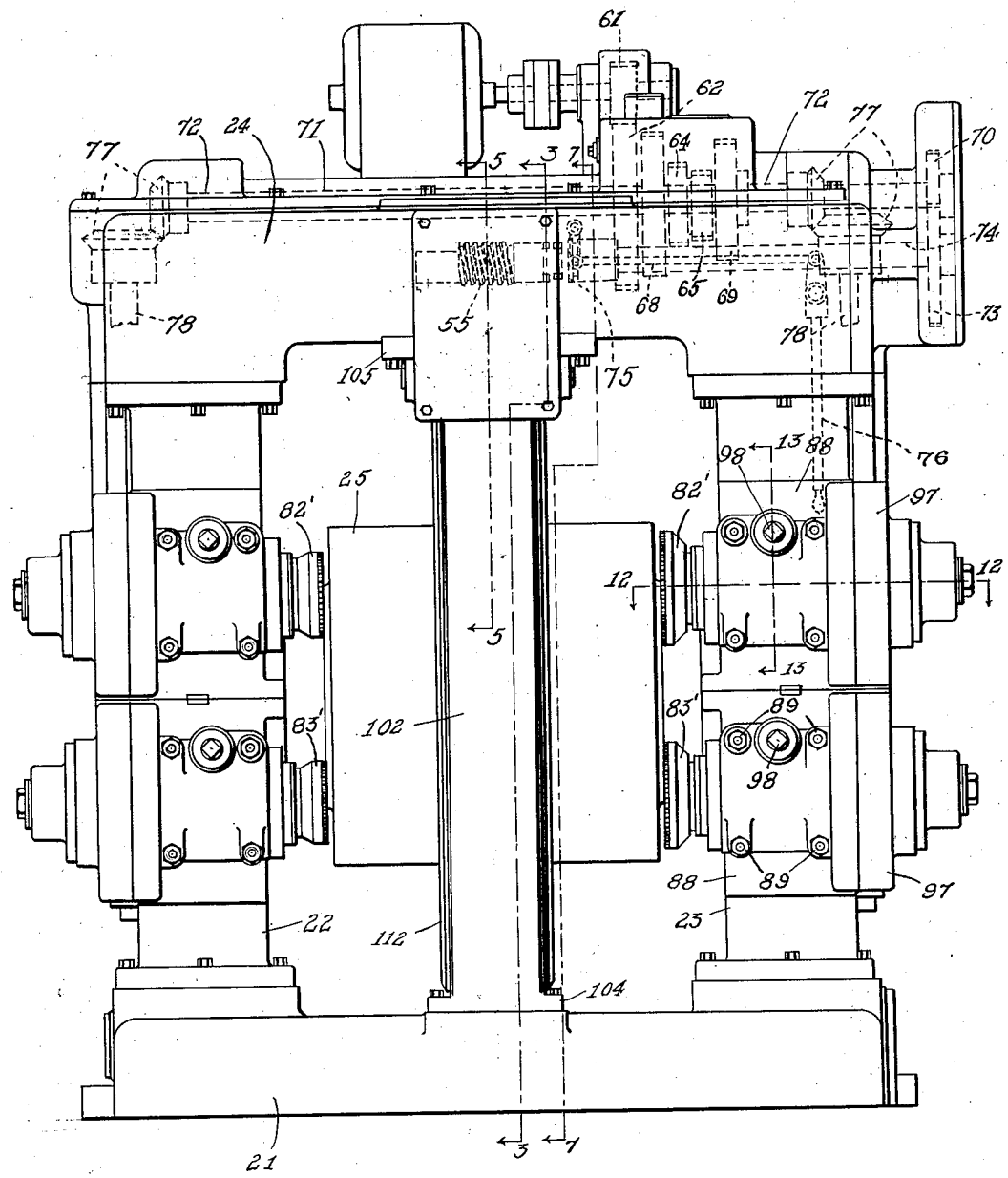
Figure 1 is a front elevation of a drum type milling machine embodying my invention.

Figs. 8, 9 and 10 are detail sections taken on the lines 8—8, 9—9 and 10—10, respectively, of Fig. 7;

Fig. 11 is a detail longitudinal section through the feed worm bearing housing;

Figs. 12 and 13 are enlarged sections taken on the lines 12—12 and 13—13, respectively, of Fig. 1;

Fig. 14 is a face view of the cutter-carrying end of a spindle;

Fig. 15 is a top view of the drive gearing on the top of the machine, with the motor and its driving pinion removed; and Fig. 16 is a section taken on the line 16—16 of Fig. 15.

Fig. 17 is a somewhat diagrammatic view of a modified form of work drum, embodying my invention.

The present invention is for purpose of illustration, embodied in a drum type milling machine such as disclosed in my U. S. Letters Patent No. 1,414,812; and while my invention is especially advantageous in this embodiment it is, nevertheless, adaptable to other drum type milling machines. The present illustration also embodies certain improvements claimed in my co-pending applications, Serial Nos. 508,340, 508,341 and 513,843.

A detailed description of the construction and advantages of such improvements will, therefore, be unnecessary except in so far as needed for conveying an understanding of the present invention.

Referring more particularly to the drawings, the frame structure is made up of a number of heavy hollow castings comprising a base 21, side housings 22 and 23 and a top plate 24, all of which are suitably secured together in the operative relation shown by means such as bolts. In this particular instance the base is provided with broad flat pads on which the side housings are seated and bolted, and the top plate has broad flat faces at its ends bolted onto the side housings, this providing in effect an integral frame structure very rigid and desirable for machines of this type.

The work-carrying drum interposed between and mounted for rotation on the side housings about a horizontal axis and designated generally by reference character 25, may be of any suitable or preferred construction. For example, the drum may be of the axle type disclosed in my patent above mentioned. In the present instance the drum has formed integrally therewith trunnion ends 26 which are journaled in suitable bearings 27 in the side housings. In accordance, however, with one phase of the present invention the bearings for the drum are of an exceptionally simple type, especially inasmuch as the end thrust of the drum is not taken entirely by the side housings or the drum bearings therein, but in part by an intermediate bearing structure which will be later described. Each journal bearing for the drum comprises a longitudinally split bearing sleeve (Figs. 2 and 4) inserted endwise into a cylindrical opening 28 in each housing. In order to take up for wear I have provided a simple means for contracting each split bearing, consisting of a key wedge 29 located in a key slot in its housing and adapted to be pulled up to position by means of a screw 31 threaded into the housing, as plainly shown in Fig. 4. A cover 32 closes the outer end of each trunnion bearing and is removable for access to the wedge screw 31. A dust and packing ring 33 interposed between the inner end of each trunnion bearing and the adjacent walls of the side housing and drum, is suitably secured in position as by means of bolts 34. This ring may of itself be in the nature of a packing and it may carry a suitable additional packing 35 for preventing loss of oil from the trunnion bearing and for keeping out dust and foreign matter.

Figure 2:
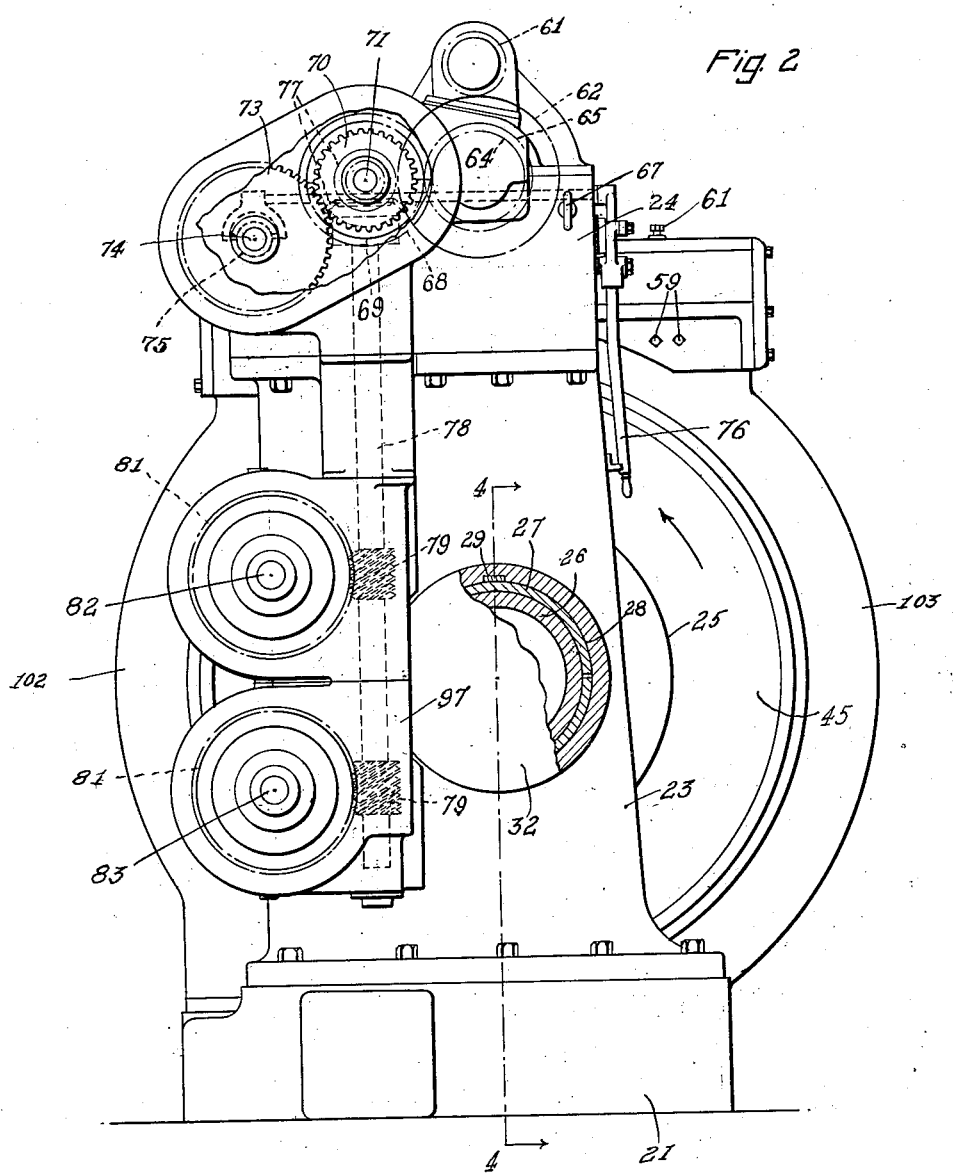
Fig. 2 is an end elevation of the machine partly broken away.

In machines of this type it is customary to continuously revolve the drum as for example, in a clockwise direction viewing Fig. 2, and to unload and reload the work-pieces at the right hand side of the machine, which becomes the loading station. The work-pieces will be carried between and machined by the milling cutters which may be mounted at any desired location on the side housings or any other part of the frame structure, as will be described more fully hereinafter. Inasmuch as machines of this type are generally designed for a single purpose, that is, for machining parts of a certain size or range of sizes, the work drum, and in fact the entire machine, is proportioned with this in view. In the present example the work consists in milling the top and bottom of a cylinder block and, more particularly, to do this in two operations. To this end I provide suitable fixtures on the drum for carrying cylinder blocks at each end thereof and in circumferentially spaced relation so that the cylinder blocks at one end of the drum are located with the top end out and at the other end of the drum with the bottom end out, thus presenting the tops and bottoms of the cylinders at the opposite ends of the drum to the milling cutters mounted on the adjacent side housings. This arrangement is clearly shown in Fig. 6, in which the cylinder block 36 is mounted on a fixture 37 so as to present the bottom face 38 of the block to the cutters; and at the opposite end of the drum a cylinder block 39 is mounted on a fixture 41 with the top face 42 presented to the adjacent cutters. In this particular instance the bottom face 38 is milled in the first operation and the top face 42 in the second operation. The cylinder blocks or castings at the opposite ends of the drum are arranged in staggered relation to those shown in Fig. 3, so that the total cutting operation will be practically continuous. The circumferential spacing of the castings at one end of the drum is shown in dotted lines in Fig. 3. It should be understood of course, that this is merely one example of many involving the mounting of the work-pieces on the drum, and in each instance a suitable fixture will be provided, or the drum will be suitably constructed for carrying the work-pieces.

In the present invention I have aimed to impart the feed movement to the work drum in a most direct and efficient manner, this being accomplished by mounting a worm wheel of comparatively large diameter directly on the drum, preferably centrally intermediate the ends thereof, so that the pull on the drum is in a line centrally between the work-pieces or between the faces being machined, thus reducing to the smallest degree the torque stresses. This combined with other features and with the general design of the machine practically eliminates chatter and vibration and is an important factor in producing a smooth feed movement and contributing to a higher degree of accuracy and finish in milling operations of this kind. The large diameter of the gear or worm wheel is desirable because of the leverage advantage gained and further because it makes possible the location of the driving worm on either the top or bottom of the frame structure, preferable on the top plate so that the driving mechanism is removed from the floor and may be compactly arranged in the enclosure of the top plate structure. This construction also promoted simplicity and durability in the driving parts and has other advantages mentioned hereinafter.

I have shown two embodiments of this phase of my invention, one in which the work-pieces are mounted on each end of the drum with the worm wheel interposed, as shown in Fig. 6, and the other in which the work-pieces are mounted in the same radial plane as the worm wheel, as shown in Fig. 17. In each form of the invention the worm wheel is positioned intermediate the faces to be machined.

Referring more particularly to the first mentioned embodiment, it will be observed that the worm wheel proper, designated by 43, is fixedly secured to a heavy web structure 44, in the present instance integral with the drum 25. Said web structure provides radial walls 45 against which the fixtures 37 and 41 are bolted, said fixtures being also bolted directly to the periphery of the drum as shown in Fig. 6.

The worm wheel will be driven by a feed worm 46 suitably located and mounted on the frame structure, preferably in connection with the top plate. As shown in Fig. 5, the worm 46 is integral with a worm shaft 47 journaled in bearings 48 and 49 mounted in a housing designated generally by 51. This bearing housing, rectangular in cross section as shown in Figs. 6, 8 and 10, fits from end to end in a socket 52 in the top plate reaching from front to back thereof. Said bearing housing is rigidly but adjustably secured in said socket as will be presently described. Suitable retaining means hold the worm shaft 47 against axial displacement with respect to the housing 51, and the end thrust of said shaft 47 (assuming that it is revolved in a clockwise direction viewing Fig. 6) is taken by a thrust bearing 53 against the front end of the bearing housing.

The drum feed worm shaft may be driven by suitable mechanism such, for example, as a worm gear 54 fixed to the forward end of said shaft and in turn driven by a worm 55 shown in Figs. 1 and 5, suitably journaled in bearings fixed with respect to the top plate.

When assembling the drum feed mechanism thus far described, the housing 51 will be positioned in the socket 52 with the drum feed worm 46 in mesh with the worm wheel 43 and the worm wheel 54 in mesh with the worm 55. When the bearing housing has been positioned with said gears or worms in proper operative relation, previously drilled holes 56 and 57 (Fig. 10) in the housing 51 and a worm wheel shield, respectively, (presently more fully described) will be reamed for the reception of a locating and pivot pin 58. After the housing 51 has been thus accurately located it will be rigidly secured in the set position by means of set screws 59 threaded in the frame structure and tightened against the upright side walls of said housing. This construction is designed not only for the purpose of simplicity and for facilitating assembling the feed mechanism, but also to permit quick and easy takeup for wear between the several worms and their respective worm wheels. It will be manifest that this takeup may be effected by loosening the bolts 59 and forcing the rear end of the housing 51 downward as by means of a set screw 61 threaded in the top plate cover and bearing against the top of said housing, thereby swinging the housing on the pivot pin 58 so as to lower the worm 46 and raise the worm wheel 54. Said pivot pin is located closer to the worm wheel 54 than to the worm 46 so that the takeup adjustment will be proportional to the wear between the two sets of worms and worm wheels. After such adjustment, the housing 51 will be secured in position by the set screws 59.

The driving mechanism mounted on the top plate structure may be of any suitable or preferred construction, that shown being designed for transmitting continuous feed movement to the work drum at any of a number of different speeds. Such driving mechanism also revolves the cutter spindles which will be presently described, and includes a clutch whereby the work drum may be stopped independently of the spindles. Referring to Figs. 1, 2, 15 and 16, said driving mechanism comprises a motor-driven spur pinion 61 meshing with a spur gear 62 fixed to a shaft 63 on which is splined a set of gears 64 and 65 adapted to be shifted by means of a rod 66 operable at one end or side of the machine by a handle 67, for engagement with the gears 68 and 69, respectively. The latter gears are fixed to a shaft 71 journaled in bearings 72 on the top plate and reaching substantially from end to end thereof. Said shiftable gears provide a change-speed drive between the shaft 63 and 71. Said shaft 71 is continued beyond one end of the machine and connected by change-speed or pick-off gears 70 and 73 to a shaft 74 coaxial with the worm 55, above mentioned. The clutch 75 on the shaft 74 is shiftable by means of a lever 76 to connect and disconnect the shaft 74 and said worm 55, the parts connecting the lever and clutch being shown in Figs. 1 and 2. As shown in Fig. 16, the gear 62 is connected to the shaft 63 through the agency of a shear pin 77 which will give way in case of excessive strain occasioned by accident or mis-use of the machine. Feed movement may therefore be imparted to the work drum at either speed afforded by the gear 64 and 65 or at any number of additional speeds afforded by changing the gear ratio between the shaft 71 and 74 by the substitution of other gears and transposing these gears.

Said driving mechanism also serves to revolve the cutter spindles which in the present example are mounted on the side housings at the front thereof in vertically spaced relation. The drive to said spindle is transmitted from both ends of the shaft 71 through bevel gears 77 to a vertical worm shaft 78 journaled in each side housing intermediate the drum bearing therein and the cutter spindles at the face thereof. Each shaft 78 has a pair of worms 79 meshing with worm wheels 81 coaxial and in driving connection with the cutter spindles on its respective housing. The cutter spindles 82 and 83 on each side housing are preferably, but not necessarily, for the purpose of carrying roughing and finishing cutters, respectively, designated in Fig. 1 by $82^1$ and $83^1$. When the driving mechanism is in operation and the clutch 75 engaged, the work drum and the cutter spindles will be continuously revolved at proper speeds, the drum in a counter clockwise direction viewing Fig. 2, and the cutters preferably in a clockwise direction.

In this case the cutter spindles are mounted in a fixed location on each side housing and, inasmuch as the spindles are similarly constructed and mounted, a description of one will suffice. Referring more particularly to Figs. 1, 2, 12, 13 and 14 it will be seen that the spindle 82 is of the tapered type, its tapered end fitting in a tapered bearing 84 which is carried by the quill 85. Said quill is supported for axial movement upon and with respect to the side housing, the supporting bearing comprising a half bearing section 86 formed in the side housing, that is, in the front face thereof, and a complemental half bearing section 87 formed by a cover plate 88 secured by bolts 89 to the face of the side housing. The cutter-carrying end of the spindle has a thrust bearing 91 against the spindle bearing 84 and the quill 85. The spindle is held against its tapered bearing by means of a sleeve 92 splined on the driving end of the spindle and held against the end of the bearing 84 and the quill 85 by means of a nut 93 threaded onto the end of the spindle remote from its cutter-carrying end. This construction permits adjustment for wear in the spindle bearing without removing any parts other than the cover which encloses the adjusting nut. The worm wheel 81 which drives the spindle as above described, has an elongated hub 94 journaled at each end in bearings 95 held between the cover plate 88 and the housing. The worm wheel hub drives the spindle sleeve 92 through the agency of a suitable spline or key construction 96.

An advantage of the foregoing construction is that the effective diameter of the spindle end remote from the cutter is equal to the outer diameter of the sleeve 92, thereby giving a large spindle cross-section at the power applying end. Another advantage is the facility with which the worm wheel 81 and the spindle may be removed or remounted. The end cover plate 97 carries the outer section of the bearing 95 and is bolted to the side housing 23 and to the cover plate 88 for holding the spindle worm wheel in position. The spindle may be axially adjusted for advancing and retracting its cutter by turning a square-end shaft 98 at the front of the machine, which is journaled in the front cover plate and fixed to a spur pinion 99 meshing with a rack 101 on the quill.

Referring again to the work drum, it will be observed that a housing or shield is provided for enclosing those portions of the worm wheel 43 which would otherwise be exposed at the front and the back of the machine. This housing not only provides a protective shield about the worm wheel but is also constructed to provide an oil tight case and an intermediate bearing for the drum for resisting the end thrust thereof, and further, to establish greater rigidity between the base and top plate of the frame structure. Referring to Fig. 7, it will be seen that this intermediate housing is formed of two half sections designated generally by 102 and 103. Each section has a broad flat base 104 and top 105, respectively bolted to flat complemental faces on the base 21 and top plate 24, the intermediate housing reaching from front to back of the base and top plate as plainly shown in Fig. 7. Each intermediate housing section or shield is shaped in cross section, to provide side walls 106 joined by an end wall 107, (Fig. 9), these walls forming an enclosure for the worm gear 43. The side walls of the housing sections 102 and 103 jointly provide annular bearings which engage the sides of the worm wheel 43, providing end thrust bearings therefor. These end thrust bearings are designated by 108 and 109, the latter being an adjustable bearing for taking up wear. Each intermediate housing section at its upper end is further shaped, as shown in Figs. 8 and 10, to receive the feed worm bearing housing 51 and hold it against lateral displacement. It will be noted that the pivot pin 58 above mentioned is supported on the housing section or shield 102 and that the bolts 59 which hold the housing 51 in position are threaded through the side walls of both housing sections 102 and 103 and clamped against said housing.

Figure 3:
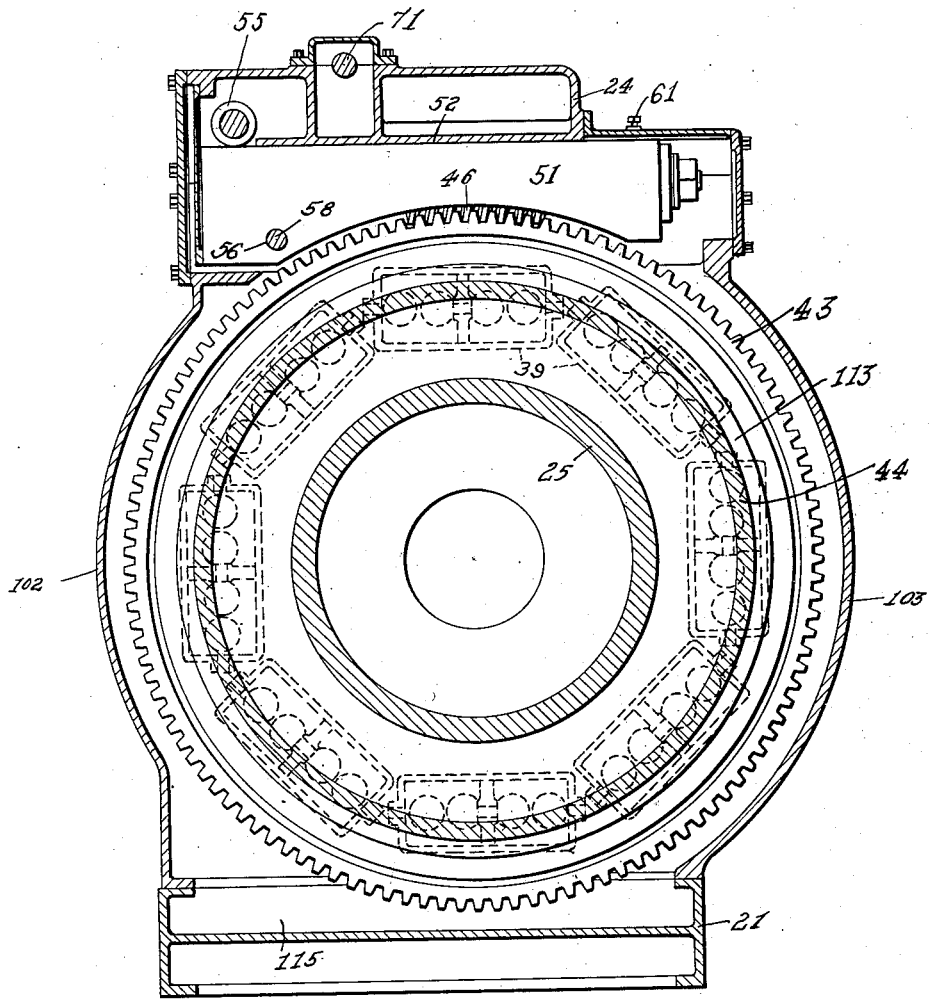
Fig. 3 is a section taken on the line 3—3 of Fig. 1.

It will be observed that the walls 45 of the worm wheel web structure which serve to support the fixtures, are flush with the end walls of the intermediate housing sections 102 and 103. The joint between these faces is grooved and filled with packing material 111 which is retained in position by a packing or dust ring 112 fixed to the face of the worm wheel web. In the periphery of the worm wheel web there is formed at each side or end of the worm wheel proper an annular oil groove 113 which serves to collect the oil which has been fed from overhead to the worm 46 through a pipe 114 (Fig. 5) and runs down through the bearings 108 and 109. The oil drains down through these grooves 113 to a well 115 in the base (Figs. 3 and 4). In order to prevent the oil from working out through the packings 111 at the underside of the drum I have provided oil grooves 116 in each side wall 106 (Fig. 9) intermediate the packing 111 and the oil groove 113. These grooves 116 are connected by a series of grooves or short oil holes 117 the approximate location of which is shown in Fig. 7, which convey any oil reaching the grooves 116, inwardly and downwardly so that it will drain into the well at the bottom rather than flow outwardly to the packing 111.

While the intermediate housing structure just described is not essential to my invention in its broader aspect, that is, to the mounting of a worm wheel or feed gear centrally on the work drum, it has nevertheless a number of practical advantages. It provides a protective housing or shield for the worm wheel, provides end thrust bearings therefor, establishes greater rigidity between the base and the top plate, and forms part of a dust and oil tight casing for said worm wheel.

I am aware that heretofore a worm wheel has been located on a rotary work carrier intermediate the work-pieces thereon for rotating the carrier, but so far as I am aware the prior applications of this mechanical expedient have been in connection with either ordinary milling machine fixtures or in milling machines having a frame work and organization of parts much different from the type of continuous milling machine to which the present invention relates, characterized by my patent and copending applications above mentioned. In these machines the rotary work drum or carrier is interposed between and journaled on laterally spaced upright hollow column housings forming part of a rigid frame structure. One or more surface milling tool spindles are mounted either on the front or interiorly of one or both of the housings for milling work-pieces carried in succession between them by the rotary drum. According to the present invention I mount a gear of large diameter directly on the work drum or carrier between the housings as described above and drive said gear by means of a pinion mounted in the top of the frame structure between the housings. By reason of this arrangement the driving pinion is close-coupled with the driving mechanism on the top of the frame structure, thereby enabling a comparatively short driving train between the prime mover and pinion and, in the present embodiment, locating the drum driving worm close to the roughing cutters 82' and consequently close to the heavier milling operations or work being done. Another advantage is the convenience in assembly and the accessibility of the driving mechanism for maintenance. My invention also provides for mounting the drum driving pinion or worm in an enclosure or housing such as in the hollow top 24 which not only protects and gives support to the worm and driving mechanism but also provides an oil tight enclosure for lubrication purposes. In the preferred embodiment of my invention this top structure provides an overhead oil reservoir to which lubricant is lifted by a pump from the well 115 as disclosed in my co-pending application, Serial No. 508,341, and from which reservoir the lubricant is distributed to various parts including the drum worm wheel, its driving worm, the spindle driving trains and the spindles. In practice this lubricant becomes heated after its passage through the machine. After being raised to the top reservoir it is cooled and feeds to the drum driving parts which transmit an enormous pressure. As a result of this method of oil circulation and location of the driving mechanism, the oil delivered thereto had an opportunity to cool and is delivered in a fresh and clean condition.

It is believed that the purposes and objects of my invention will be readily understood from the foregoing, and while I have illustrated in the drawings but a single working embodiment (with the exception of the mounting of the work-pieces) it should be understood that in putting my invention into practice many changes might be made and modifications employed without departing from the spirit and scope of the invention as expressed in the appended claims, in which—

I claim:

1. In a milling machine, in combination, a rotary work-carrying drum, cutter spindles located for milling work on opposite ends of the drum, a worm wheel fixed to the drum intermediate its ends and circumscribing its work-carrying portion, a driving worm meshing with the worm wheel, and a protective housing for the worm wheel serving also for taking side thrust thereof.

2. In a drum type milling machine, in combination, a frame structure including laterally spaced upright side housings joined by a base and a top portion, a rotary work-carrying drum interposed between the housings, surface milling tool spindles mounted on the housings for surfacing work pieces carried between them by the drum, mechanism for rotating the drum and the spindles including a gear fixed to the drum intermediate the side housings, and a housing enclosing the drum and interposed between and connected to the top and bottom portions of the frame structure for rigidly connecting them intermediate the side-housings.

3. In a drum type milling machine, in combination, a frame structure including laterally spaced upright side housings joined by a base and a top portion, a rotary work-carrying drum interposed between the housings, surface milling tool spindles mounted on the housings for surfacing work pieces carried between them by the drum, mechanism for rotating the drum and the spindles including a gear fixed to the drum intermediate the side housings, and a housing enclosing the drum and interposed between and connected to the top and bottom portions of the frame structure for rigidly connecting them intermediate the side housings, the intermediate housing serving also to bear side thrust from the work drum and its gear.

4. In a drum type milling machine, in combination, a frame structure including laterally spaced upright side housings joined by a base and a top portion, a rotary work-carrying drum interposed between the housings, surface milling tool spindles mounted on the housings for surfacing work pieces carried between them by the drum, mechanism for rotating the drum and the spindles including a gear fixed to the drum intermediate the side housings, a housing enclosing the drum and interposed between and connected to the top and bottom portions of the frame structure for rigidly connecting them intermediate the side housings, circumferential oil grooves in the gear, and a packing between each side of the gear and the gear housing.

5. In a drum type milling machine, in combination, a frame structure including laterally spaced upright side housings joined by a base and a top portion, a rotary work-carrying drum interposed between the housings, surface milling tool spindles mounted on the housings for surfacing work pieces carried between them by the drum, mechanism for rotating the drum and the spindles including a gear fixed to the drum intermediate the side housings, and a housing enclosing the drum and interposed between and connected to the top and bottom portions of the frame structure for rigidly connecting them intermediate the side housings, the intermediate housing being shaped to enclose the periphery and both sides of the drum gear and being provided with bearing faces engaging both sides of said drum gear to resist side thrust thereof.

6. In a drum type milling machine, in combination, a frame structure including upright side housings joined by a base and a top portion, a work-carrying drum interposed between and mounted on the side housings, cutter spindles mounted on the frame structure for milling work-pieces on the drum, a worm wheel fixed to the drum intermediate the side housings, a driving worm meshing with the worm wheel, and side thrust bearings for the worm wheel carried by the base and top portions.

7. A drum type milling machine as set forth in claim 6, in which the said bearings are carried by means establishing a rigid connection between the base and top portions.

8. In a drum type milling machine, in combination, a frame structure, a rotary work-carrying drum mounted thereon, cutter spindles mounted on the frame structure for milling work on the drum, a worm wheel fixed to the drum, a driving worm meshing with said worm wheel, a shaft to which said worm is fixed, a worm gear fixed to said shaft, a driving worm meshing with the second mentioned worm gear, and a bearing housing for said worm shaft mounted on the frame structure so as to be adjustable for simultaneously taking up wear between both pairs of worms and worm wheels.

9. A drum type milling machine as set forth in claim 8, in which said housing is removably seated in the frame structure.

10. In a drum type milling machine, in combination, spaced housings, a work-carrying drum interposed between said housings and having trunnion ends, a longitudinally split bearing suported in each side housing providing a journal bearing for one of the trunnions, a wedge interposed between each bearing and housing and operable from the outer side thereof for contracting the bearing, a packing between the inner end of each trunnion bearing and its side housing, means for revolving the drum, a cutter for operating on work on the drum, and means cooperating with the drum intermediate the side housings for resisting side thrust of the drum.

11. In a drum type milling machine, in combination, spaced housings, a work-carrying drum interposed between the housings and journaled in bearings therein, each journal bearing being split lengthwise and insertable endwise into its housing, means for contracting each bearing for taking up wear, a packing between the inner end of each bearing and the housing, a worm wheel on the drum intermediate the housings, a driving worm meshing with the worm wheel, cutters for operating on work on the drum, and means intermediate the housings cooperating with the worm wheel for resisting the side thrust of the drum.

12. In a drum type milling machine, in combination, a frame structure including upright side housings joined by a base and a top portion, a rotary work-carrying drum interposed between and mounted on the side housings, a worm wheel fixed to the drum intermediate its ends, a driving worm meshing with the worm wheel, cutter spindles on the frame structure for machining the work-pieces, and a housing structure intermediate the side housings, rigidly connected to the base and top portions and enclosing the worm wheel.

13. In a drum type milling machine, in combination a frame structure including side housings joined by a base and a top portion, a rotary work-carrying drum interposed between the side housings and mounted thereon, a worm wheel fixed to the drum intermediate the side housings, a driving worm meshing with the worm wheel, and an intermediate housing for the worm wheel interposed between and fixed to the base and top portions.

14. In a drum type milling machine, the combination set forth in claim 13, in which the worm wheel has a web structure wider than the worm wheel proper, and said intermediate housing is substantially the same width as the web structure.

15. In a drum type milling machine, the combination set forth in claim 13, including a packing between the web structure and intermediate housing, and an annular oil groove in the web structure between each end of the worm wheel proper and the packing.

16. In a drum type milling machine, in combination, a frame structure including upright side housings joined by a base and a top portion, a rotary work-carrying drum interposed between and mounted on the side housings, a worm wheel fixed to the drum intermediate its ends, a driving worm meshing with the worm wheel, cutter spindles on the frame structure for machining the work-pieces, and a housing structure intermediate the side housings rigidly connected to the base and top portions and enclosing the worm wheel, said intermediate housing having bearings for the worm wheel adapted for resisting side thrust thereof.

17. In a milling machine, in combination, a frame structure having a quill-support opening, a quill slidable in said opening, a cutter spindle mounted for rotation in the quill so as to be held against lengthwise movement with respect thereto in one direction, a sleeve on the end of the spindle opposite from the quill in driving connection with the spindle, a nut threaded on the end of the spindle opposite from its cutter end and adapted to be tightened against said sleeve for taking up play in the spindle bearing, a gear mounted for rotation on the frame structure concentric with and circumscribing the spindle and having driving connection with the spindle sleeve, and a driving pinion meshing with said spindle gear.

18. In a milling machine, the combination set forth in claim 17, in which the bearing for the spindle gear is in two parts, one part being fixed with respect to the quill-supporting portion of the frame structure and the other part being removable at the end opposite from the cutter end of the spindle.

19. In a drum type milling machine, in combination, a frame structure, a rotary work-carrying drum mounted on the frame structure, surface milling tool spindles mounted on the frame structure for milling work-pieces carried in succession by the drum, a gear fixed to the drum, means for driving said drum gear, and a housing on the frame structure enclosing said drum gear and having bearing against the sides thereof adjacent to the periphery for maintaining the work-carrying drum in determined relation to the tool spindles.

20. In a drum type milling machine, in combination, a frame structure, a work-carrying drum journaled at its ends on the frame structure, surface milling tool spindles mounted on the frame structure in opposed relation to surface work-pieces carried between them by the drum, an annular driving portion on the drum, and a housing on the frame structure circumscribing said annular driving portion and having a thrust bearing against each side thereof for maintaining the work-carrying portion of the drum in determined relation to the surfacing tools and relieving the side thrust from the drum journal mountings.

21. In a drum type milling machine, in combination, a frame structure having laterally spaced upright housings, a rotary work-carrying drum interposed between and mounted on said housings, surface milling tool spindles mounted on the housings for surfacing work-pieces carried between them by the drum, a gear fixed to the drum intermediate the housings, and a housing rigid on the frame structure providing an oil retaining enclosure about the drum gear and having thrust bearing faces engaging both sides of said gear.

22. A drum type milling machine, comprising, in combination, a frame structure including laterally spaced upright housings joined by a top and a bottom portion, a work-carrying drum interposed between and supported on said housings, surface milling tool spindles mounted on the housings for surfacing work-pieces carried between them by the drum, a gear fixed to the drum intermediate the housings, mechanism on the frame structure for driving said gear, an oil retaining housing around the gear and connecting the base and top portions of the frame structure, means for delivering oil down through said housing, and oil retaining means between each side of the drum gear and its housing.

23. In a drum milling machine, in combination, a frame structure, a rotary work-carrying drum journaled at its ends on the frame structure, surface milling tool spindles mounted on the frame structure in opposed relation for surfacing work-pieces carried between them by the drum, a driving gear fixed to the drum intermediate its journals, and a housing structure rigid on the frame structure enclosing said drum gear and having side thrust bearing engagement therewith.

24. In a drum milling machine, in combination, a frame structure, a rotary work-carrying drum journaled at its ends on the frame structure, surface milling tool spindles mounted on the frame structure in opposed relation for surfacing work-pieces carried between them by the drum, a driving gear fixed to the drum intermediate its journals, and a housing structure rigid on the frame structure enclosing said drum gear and having side thrust bearing engagement therewith, said housing structure enclosing only the peripheral portion of the drum gear and leaving an open annular work-carrying space at each side of the gear circumscribing the drum.

25. A drum type milling machine, comprising, in combination, a frame structure having laterally spaced housings joined at one end, a work-carrying drum interposed between and journaled at its ends on said housings, surface milling tool spindles mounted on the housings in opposed relation for surfacing work-pieces carried between them by the drum, a gear fixed to the drum intermediate the housings, a drum driving pinion mounted on said end portion of the frame structure and meshing with the drum gear, and bearing members mounted on said end of the frame structure and substantially circumscribing the drum gear and engaging the sides thereof for maintaining the drum in determined relation to the surfacing tools.

26. In a drum type milling machine, in combination, a frame structure including side housings, a rotary work-carrying drum interposed between and mounted on said housings, an annular web structure fixed to the drum centrally between its ends, a gear on said web structure, a driving pinion meshing with said gear, said web structure providing radially disposed side walls and said drum providing a peripheral wall beyond each side wall, to which walls work fixtures are adapted to be attached for supporting work-pieces in circumferentially spaced relation at each side of the drum, and surface milling tool spindles on the frame structure for surfacing work-pieces on the drum.

27. In a drum type milling machine, in combination, a frame structure having spaced housings, a rotary work-carrying drum interposed between and mounted on the housings, surface milling tool spindles mounted on the housings for surfacing work-pieces carried between them by the drum, a worm gear mounted on the drum intermediate the housings, a driving worm mounted on the frame structure at one end of the housings meshing with the drum worm gear, and means on said end of the frame structure having bearing engagement with the drum worm gear for maintaining it in determined relation to its driving worm.

28. In a milling machine, in combination, a spindle supporting housing, the front wall of which is shaped to provide a semi-circular bearing support, a tool spindle, a quill in which the spindle is journaled, a front plate having a semi-circular bearing support adapted to be removably secured to the front of the housing complemental to said bearing support therein, said bearing supports providing a mounting for the spindle quill, a sleeve on the spindle at its rear end engaging the quill, a gear on said sleeve, a splined connection between the gear and sleeve and between the sleeve and spindle, means on the rear end of the spindle acting through the sleeve for axially adjusting the spindle in the quill, and a removable end plate providing bearing support for said rear end of the spindle.

29. A drum type milling machine, comprising, in combination, a frame structure including laterally spaced upright housings joined by base and top portions, a rotary work carrying drum interposed between and supported on the housings, vertically spaced surface milling tool spindles mounted on each housing, and mechanism for rotating the drum and spindles, comprising a prime mover mounted on the top portion of the frame structure, a horizontal shaft on said top portion extending between the housings and driven by the prime mover, a vertical shaft on each housing geared at its upper end to the horizontal shaft and geared at lower points to the spindles on its respective housing, a gear of relatively large diameter fixed to the drum intermediate the housings, and a pinion mounted on the top portion of the frame structure in mesh with the drum gear and driven by said horizontal shaft.

30. A drum type continuous milling machine comprising, in combination, a frame structure having laterally spaced upright housings rigidly joined at their ends by a base and a top frame structure, a rotary work-carrying drum interposed between and mounted on the housings, surface milling tool spindles mounted on the housings for surfacing work-pieces carried between them by the rotating drum, and mechanism for continuously rotating the drum and spindles including a drive shaft mounted on the top portion of the frame structure, a gear fixed to the drum intermediate the housings and being of such diameter as to reach substantially to said top frame structure, a drum-driving pinion mounted on said top frame structure and in mesh with said drum-driving gear from above, and a short driving train between said top drive shaft and the drum-driving pinion.

JOHN R. JOHNSON.